(12) United States Patent
Lee

(10) Patent No.: US 12,325,399 B2
(45) Date of Patent: Jun. 10, 2025

(54) VEHICLE CONTROL SYSTEM AND METHOD

(71) Applicant: HYUNDAI MOBIS CO., LTD., Seoul (KR)

(72) Inventor: Jeong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 493 days.

(21) Appl. No.: 17/714,342

(22) Filed: Apr. 6, 2022

(65) Prior Publication Data

US 2022/0324422 A1   Oct. 13, 2022

(30) Foreign Application Priority Data

Apr. 7, 2021   (KR) .......................... 10-2021-0045218
Apr. 12, 2021  (KR) .......................... 10-2021-0047275

(51) Int. Cl.
| | | |
|---|---|---|
| *B60T 7/22* | (2006.01) | |
| *B60R 21/0134* | (2006.01) | |
| *B60W 10/18* | (2012.01) | |
| *B60W 30/16* | (2020.01) | |
| *H04W 4/46* | (2018.01) | |
| *B60R 21/01* | (2006.01) | |
| *B60R 21/013* | (2006.01) | |

(52) U.S. Cl.
CPC ............ *B60T 7/22* (2013.01); *B60R 21/0134* (2013.01); *B60W 10/18* (2013.01); *B60W 30/162* (2013.01); *H04W 4/46* (2018.02); *B60R 2021/01013* (2013.01); *B60R 2021/01311* (2013.01); *B60T 2201/022* (2013.01); *B60T 2201/081* (2013.01); *B60W 2556/65* (2020.02)

(58) Field of Classification Search
CPC ................. B60T 7/22; B60T 2201/022; B60T 2201/081; B60T 8/17558; B60R 21/0134; B60R 2021/01013; B60R 2021/01311; B60W 10/18; B60W 30/162; B60W 2556/65; B60W 30/09; B60W 30/16; H04W 4/46; G08G 1/162; G08G 1/166; G08G 1/22
USPC ......................................................... 701/96
See application file for complete search history.

(56) References Cited

U.S. PATENT DOCUMENTS

| | | | | |
|---|---|---|---|---|
| 2004/0193374 A1* | 9/2004 | Hac | ........................ | G08G 1/166 701/301 |
| 2008/0185207 A1* | 8/2008 | Kondoh | ................ | B60W 30/16 180/272 |
| 2020/0001870 A1* | 1/2020 | Saigusa | ................ | B60W 50/04 |

FOREIGN PATENT DOCUMENTS

| | | | |
|---|---|---|---|
| DE | 112011102687 | * | 5/2013 |
| KR | 20160015689 | * | 2/2016 |

* cited by examiner

*Primary Examiner* — Muhammad Shafi
(74) *Attorney, Agent, or Firm* — NSIP Law

(57) ABSTRACT

A vehicle control system includes a setting unit to sense a plurality of forward vehicles positioned ahead of a subject vehicle in a driving direction, to classify each of the forward vehicles as a far-away vehicle or a near-by vehicle, and to set each of the far-away vehicles as an interest vehicle, a receiving unit to receive braking information of each of the interest vehicles from the respective interest vehicles, and a control unit to control braking of the subject vehicle based on the braking information of each of the interest vehicles received by the receiving unit.

16 Claims, 6 Drawing Sheets

VEHICLE CONTROL SYSTEM AND METHOD

CROSS-REFERENCE TO RELATED APPLICATION

The present application claims priority to Korean Patent Application Nos. 10-2021-0045218, filed on Apr. 7, 2021, and 10-2021-0047275, filed Apr. 12, 2021, the entire contents of which is incorporated herein for all purposes by this reference.

BACKGROUND OF THE INVENTION

Field of the Invention

The present invention relates to a vehicle control system and method and, more particularly, to a technology of receiving information of forward vehicles through V2X communication or V2V communication and controlling a subject vehicle on the basis of the information.

Description of the Related Art

A vehicle of which the driving stability and convenience for a driver is improved by combining various in information and communication (IT) technologies such as electronic, communication, control, and AI technologies is called an intelligent car or a smart car.

Such a smart car is composed of mainly a telematic technology that is a combination of wireless communication functions, such as an advanced traffic management system, an electronic toll collection system, an intelligent traffic system, etc., an infotainment technology that provides both driving-related information and an entertainment function, a driverless driving system that is targeted at an automotive navigation system, etc., and the objective of thereof is to provide optimal traffic efficiency, secure safety, and provide convenience and enjoyment to users.

In these various technologies, researches and investments have been continuously made to improve safety in the automotive industry due to the number of car accidents that increase year by year and the loss of life and property.

In particular, recently, not only various sensors for detecting surrounding situations, but also an information sharing method with other vehicles through wireless communication have been proposed and attempted to use for driving. However, according to the methods that are used at present, surrounding situations only at the moment of sensing can be recognized and past information is slightly difficult to infer.

The description provided above as a related art of the present invention is just for helping understanding the background of the present invention and should not be construed as being included in the related art known by those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention has been made in an effort to solve the problems described above and an objective of the present invention is to prevent a crash by receiving movement information of far-away vehicles, which cannot be sensed by sensors on a subject vehicle, through V2X communication or V2V communication and controlling the subject vehicle on the basis of the information.

A vehicle control system according to the present invention includes: a setting unit configured to sense a plurality of forward vehicles positioned ahead of a subject vehicle in a driving direction, to classify each of the forward vehicles as a far-away vehicle or a near-by vehicle, and to set each of the far-away vehicles as an interest vehicle; a receiving unit configured to receive braking information of each of the interest vehicles from the respective interest vehicles; and a control unit configured to control braking of the subject vehicle based on the braking information of each of the interest vehicles received by the receiving unit.

The setting unit may be configured to classify a forward vehicle at a predetermined distance or more as a far-away vehicle and to classify a forward vehicle at a distance less than the predetermined distance as a near-by vehicle.

The setting unit may be configured to set a far-away vehicle as a second or more forward vehicle from the subject vehicle.

The control unit may be configured to control braking of the subject vehicle when the braking information of one or more of the interest vehicles received by the receiving unit exceeds a reference value.

The control unit may be configured to control the subject vehicle to increase a distance from one or more of the near-by vehicles or one or more of the interest vehicles when the braking information of one or more of the interest vehicles received by the receiving unit exceeds the reference value.

The control unit may be configured to control the subject vehicle to decelerate when the braking information of one or more of the interest vehicles received by the receiving unit exceeds the reference value.

The receiving unit may be configured to estimate the braking information of each of the interest vehicles by receiving pressure of a brake pedal of each of the interest vehicles.

The vehicle control system may include a transmitting unit configured to transmit the braking information of one or more of the interest vehicles to a following vehicle when the braking information of the respective one or more interest vehicles received by the receiving unit exceeds a reference value.

The vehicle control system may include a determining unit configured to determine whether wireless communication of a following vehicle adjacent to the subject vehicle is possible, and when the determining unit determines that wireless communication of the following vehicle adjacent to the subject vehicle is impossible and braking information of one or more of the far-away vehicles exceeds the reference value, the control unit may be configured to set a passenger protection device for protecting a passenger into a standby mode.

The receiving unit may be configured to receive braking information of a first forward vehicle through V2X communication, and the control unit may be configured to improve responsiveness of a brake system of the subject vehicle when the braking information of the first forward vehicle received by the receiving unit exceeds a reference value.

The vehicle control system may include a sensing unit configured to sense a braking situation of the first forward vehicle, and the control unit may be configured to improve the responsiveness of the brake system of the subjective vehicle based on the braking information of the first forward vehicle received by the receiving unit and the braking situation of the first forward vehicle sensed by the sensing unit.

The vehicle control system may include a determining unit configured to determine whether V2X communication of an external vehicle adjacent to the subject vehicle is possible, and when the determining unit determines that V2X communication of the first forward vehicle is impossible, the control unit may be configured to improve the responsiveness of the brake system of the subject vehicle based on the braking information of the first forward vehicle sensed by the sensing unit.

A vehicle control method according to the present invention includes: sensing a plurality of forward vehicles positioned ahead of a subject vehicle in a driving direction, classifying each of the forward vehicles as a far-away vehicle or a near-by vehicle, and setting each of the far-away vehicles as an interest vehicle; receiving braking information of each of the interest vehicles from the respective interest vehicles; and controlling braking of the subject vehicle based on the braking information of each of the interest vehicles.

The vehicle control method may include determining that the braking information of one or more of the interest vehicles is a reference value or more, and the controlling of braking may control braking of the subject vehicle when the braking information of one or more of the interest vehicles is the reference value or more.

The vehicle control method may include transmitting the braking information of one or more of the interest vehicles to a following vehicle adjacent to the subject vehicle when the braking information of the respective one or more interest vehicles exceeds a reference value.

The vehicle control method may include determining whether wireless communication of the following vehicle adjacent to the subject vehicle is possible; and setting a passenger protection device for protecting a passenger into a standby mode when wireless communication of the following vehicle adjacent to the subject vehicle is impossible and when the braking information of one or more of the interest vehicles exceeds the reference value.

The receiving may include receiving braking information of a first forward vehicle through V2X communication, and the vehicle control method may include determining that the braking information of the first forward vehicle is a reference value or more; and improving responsiveness of a brake system of the subject vehicle when the braking information of the first forward vehicle exceeds the reference value.

The vehicle control method may include sensing a braking situation of the first forward vehicle before the determining, and the determining may determine whether the braking information of the first forward vehicle is the reference value or more based on the braking information of the first forward vehicle and the braking situation of the first forward vehicle.

The vehicle control method may further include: transmitting the braking information of the first forward vehicle to a following vehicle when the braking information of the first forward vehicle exceeds the reference value; determining whether V2X communication of an external vehicle adjacent to the subject vehicle is possible before the transmitting; and setting a passenger protection device for protecting a passenger into a standby mode when it is determined that V2X communication of the following vehicle is impossible and when the braking information of the first forward vehicle exceeds the reference value.

The vehicle control method may further include: receiving braking information of a second forward vehicle positioned ahead of the first forward vehicle; and comparing the braking information of the first forward vehicle or the second forward vehicle with the reference value, and the improving of responsiveness of the brake system of the subject vehicle may improve the responsiveness of the brake system of the subject vehicle based on the braking information of the first forward vehicle and the second forward vehicle.

The vehicle control system according to the present invention classifies forward vehicle into a near-by vehicle and far-away vehicles, selects all or some of the far-away vehicles as interest vehicle, receives braking information of the interest vehicles, and controls braking of a subject vehicle when the received braking information of the interest vehicles is a reference value or more, thereby having an effect of being able to avoid a collision with the near-by vehicle or take measures against the collision.

Further, when the received braking information of an interest vehicle is the reference value or more, the braking information of the interest vehicle is transmitted to a following vehicle, whereby the following vehicle also takes measures against a collision, so there is an effect that it is possible to prevent a chain rear-end collision.

Further, there is an effect that when wireless communication of a rear vehicle is impossible, it is possible to minimize injury to a driver by taking measures against a rear collision by operating a passenger protection device in the subject vehicle in a standby mode.

Further, in another embodiment of the present invention, braking information of a first forward vehicle driven ahead of the subject vehicle is received through V2X communication, a braking situation of the first forward vehicle is sensed through a sensor on the subject vehicle, and braking of the subject vehicle is controlled on the basis of the braking information of the first forward vehicle received through V2X communication and the braking information of the first forward vehicle sensed through the sensor, so there is an effect that it is possible to prevent a collision with the first forward vehicle.

Further, there is an effect that it is possible to take measures against a chain rear-end collision with a first forward vehicle by receiving braking information of a second forward vehicle positioned ahead of the first forward vehicle through V2X communication and by controlling braking of the subject vehicle.

Further, since braking information of a first forward vehicle or a second forward vehicle is transmitted to a following vehicle when the received braking information of the first forward vehicle or the second forward vehicle is a reference value or more, there is an effect that it is possible to prevent a chain rear-end collision because the following vehicle also takes measures against a collision.

Further, there is an effect that when wireless communication of a rear vehicle is impossible, it is possible to minimize injury to a driver by taking measures against a rear collision by operating a passenger protection device in the subject vehicle in a standby mode.

Other features and aspects will be apparent from the following detailed description, the drawings, and the claims.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
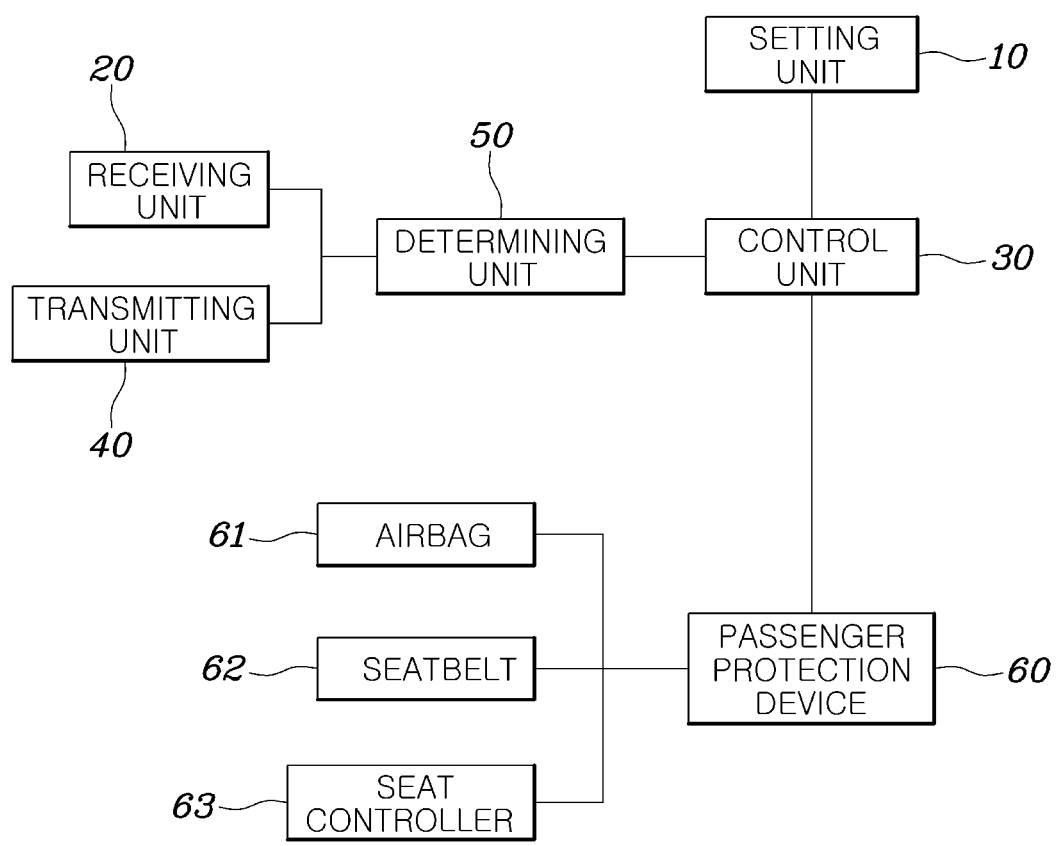
FIG. 1 is a configuration diagram of a vehicle control system according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various components, these components should not be limited by these terms. These terms are only used to distinguish one element from another element. For instance, a first element discussed below could be termed a second element without departing from the right range of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

A setting unit 10, a receiving unit 20, a control unit 30, a transmitting unit 40, and a determining unit 50 according to exemplary embodiments of the present invention can be implemented through a nonvolatile memory (not shown) configured to store data about algorithms for controlling operation of various components of a vehicle 100 or about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

Figure 2:
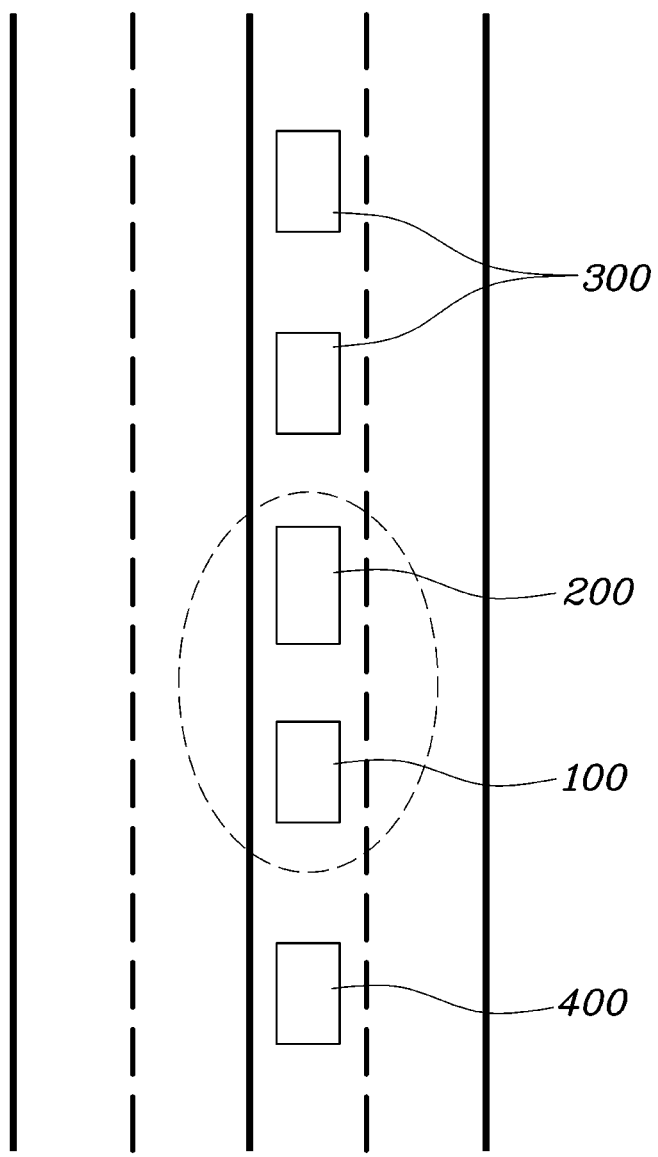
FIG. 2 is a diagram showing discriminating a near-by vehicle, a far-away vehicle, and a following vehicle when a subject vehicle is driven.

FIG. 1 is a configuration diagram of a vehicle control system according to an embodiment of the present invention and FIG. 2 is a diagram showing discriminating a near-by vehicle 200, a far-away vehicle 300, and a following vehicle when the vehicle 100 is driven.

An exemplary embodiment of a vehicle control system according to an embodiment of the present invention is described with reference to FIGS. 1 and 2.

A V2V communication technology that transmits vehicle information to external vehicle or receives vehicle information of external vehicle through wireless communication between the vehicles 100 or a V2X communication technology that transmits vehicle information to external vehicle or receives vehicle information of external vehicle through a previously provided infra system can be applied to the vehicle control system according to the present invention.

The vehicle control system according to the present invention further includes: a setting unit 10 that senses a plurality of forward vehicles 200 and 300 positioned ahead of a vehicle 100 in the driving direction, classifies the forward vehicles 200 and 300 into a far-away vehicle 300 and a short-range vehicle 200, and sets the far-away vehicle 300 as an interest vehicle 300; a receiving unit 20 that receives braking information of the interest vehicle 300 set by the setting unit 10 from the interest vehicle 300; and a control unit 30 that controls braking the vehicle 100 on the basis of the braking information of the interest vehicle 300 received by the receiving unit 20.

The setting unit 10 can find out relative positions of the vehicle 100 by communicating with a plurality of forward vehicles 200 and 300 driven ahead of the vehicle 100 through V2X communication or V2V communication and can classify the plurality of forward vehicles 200 and 300, which are driven ahead of the vehicle 100, into a near-by vehicles 200 and far-away vehicles 300 on the basis of the relative location.

The near-by vehicle 200 and the far-away vehicle 300 may be discriminated on the basis a preset distance from the vehicle 100 or an n-th vehicle of the vehicles driven ahead of the vehicle 100.

The setting unit 10 can set some or all of the plurality of classified vehicles 300 as interest vehicles 300.

The receiving unit 20 can receive braking information of the plurality of or designated interest vehicles 300 set by the setting unit 10 from the interest vehicles 300 through V2V communication.

The braking information, which is information that is used to brake the vehicle 100, may include not only the amount of braking by brake pressure, but also the amount of braking by an engine brake.

The control unit 30 can control braking of the vehicle 100 on the basis of the braking information of the interest vehicles 300 received by the receiving unit 20.

Accordingly, there is an effect that it is possible to prevent a crash by controlling the braking situation of the vehicle 100 when the interest vehicles 300 set from the far-away vehicles 300 are rapidly braked by receiving the information of the far-away vehicles 300 which cannot be sensed by sensors such as a radar sensor, a camera sensor, or a lidar sensor.

The setting unit 10 can classify forward vehicles 200 and 300 at a preset distance or more as far-away vehicles 300 and forward vehicles 200 and 300 at a distance less than the preset distance as near-by vehicles 200.

As shown in FIG. 2, it is possible to classify vehicles 200 and 300 at a preset distance or more of vehicles driven ahead of the vehicle 100 as far-away vehicles and vehicles at a distance less than the preset distance as near-by vehicles 200 on the basis of V2X communication.

The distances between the vehicle 100 and the forward vehicles 200 and 300 can be calculated by communicating with a road driving information system through V2X communication, and the setting unit 10 can discriminate near-by vehicles 200 and far-away vehicles 300 on the basis of the distances.

The setting unit 10 may set second and more forward vehicles from the vehicle 100 as far-away vehicles 300.

As shown in FIG. 2, information of a plurality of forward vehicles 200 and 300 may be transmitted directly from the forward vehicles 200 and 300 through V2X communication or may be received to the vehicle 100 through an external system.

Accordingly, the setting unit 10 can classify second and more forward vehicles from the vehicle 100, which cannot sensed by the sensing system of the vehicle 100, as far-away vehicles 300 and can set the far-away vehicles 300 as interest vehicles 300.

That is, it is possible to receive information of far-away vehicles 300 that cannot be sensed by the sensors of the vehicle 100 through V2X communication and it is possible to control braking of the vehicle 100 on the basis of the information.

The control unit 30 can control braking of the vehicle 100 when the braking information of an interest vehicle 300 received by the receiving unit 20 exceeds a reference value.

The receiving unit 20 receives braking information of the interest vehicles 300 through V2X communication, in which the braking information may be a variation of the brake pressure or the speed of the interest vehicles 300.

When brake pressure of an interest vehicle 300 by the receiving unit 20 is a preset reference value or more or the amount of deceleration of the interest vehicle 300 received by the receiving unit 20 is out of a predetermined range, the control unit 30 can determine that the vehicle 300 is rapidly braked, whereby the control unit 30 controls the braking amount of the vehicle 100 to be increased. Accordingly, there is an effect that it is possible to a collision with near-by vehicles 200.

As a first embodiment that controls braking of the vehicle 100, when braking information of an interest vehicle 300 received by the receiving unit 20 exceeds the reference value, the control unit 30 can control the vehicle 100 to increase the distance from a near-by vehicle 200 or the interest vehicle 300.

When braking information of an interest vehicle 300 received by the receiving unit 20 exceeds the reference value, the control unit 30 may measure the relative distance between the vehicle 100 and the interest vehicle 300 and control driving of the vehicle 100 to increase the relative distance.

Accordingly, there is an effect that even it a far-away vehicle 300 is rapidly braked and then a near-by vehicle 200 is rapidly braked, it is possible to avoid or prevent a crash of the vehicle 100 and the near-by vehicle 200.

As a second embodiment that controls braking of the vehicle 100, when braking information of an interest vehicle 300 received by the receiving unit 20 exceeds the reference value, the control unit 30 can control the vehicle 100 to decelerate.

The control unit 30 can control the vehicle 100 to decrease the absolute speed when braking information of an interest vehicle 300 received by the receiving unit 20 exceeds the reference value. That is, the control unit 30 may decelerate the vehicle by stopping acceleration of the vehicle 100 or may decelerate the vehicle 100 to a set target speed by operating the brake system of the vehicle.

Accordingly, there is an effect that even it a far-away vehicle 300 is rapidly braked and then a near-by vehicle 200 is rapidly braked, it is possible to prevent a collision with the near-by vehicle 200 by rapidly braking the vehicle 100, depending on the speed of the vehicle 100.

The receiving unit 20 can estimate braking information of an interest vehicle 300 by receiving the pressure of the brake pedal of the interest vehicle 300.

That is, the braking information of an interest vehicle 300 received by the receiving unit 20 may be pressure information of the brake pedal of the interest vehicle 300 and a preset reference value may be the pressure value of the brake pedal.

Accordingly, when the received pressure information of the brake pedal of an interest vehicle 300 is the preset value or more, the control unit 30 can determine that the interest vehicle 300 is rapidly braked.

Whether an interest vehicle 300 is rapidly braked can be received through V2X communication on the basis of a deceleration amount of the interest vehicle 300 other than pressure information of a brake pedal.

The vehicle control system may further include a transmitting unit 40 that transmits braking information of an interest vehicle 300 to a following vehicle 400 when the braking information of the interest vehicle 300 received by the receiving unit 20 exceeds a reference value.

In order to inform a following vehicle 400 behind the vehicle 100 that an interest vehicle 300 is rapidly braked, the transmitting unit 40 can transmit the braking information of the interest vehicle 300 to the following vehicle 400 when the braking information of the interest vehicle 300 is the reference value or more.

Accordingly, there is an effect that the following vehicle 400 can take measures against rapid braking of the interest vehicle 300 and take precautions against a rear-end collision of the following vehicle 400.

The vehicle control system further includes a determining unit 50 that determines whether wireless communication of a following vehicle 400 adjacent to the vehicle 100 is possible. When the determining unit 50 determines wireless communication of the following vehicle 400 is impossible and the braking information of a far-away vehicle 300 exceeds a reference value, the control unit 30 can set a passenger protection device for protecting a passenger in a standby mode.

The passenger protection device, which is a device provided in the vehicle 100 to minimize injury to a passenger in a collision outside the vehicle 100, can keep a passenger safe even a collision occurs when it is in operation.

When V2V communication or V2X communication of a following vehicle 400 is impossible, there is a possibility of a collision of the following vehicle 400 and the vehicle 100.

In order to take measures against such a collision, when braking information about rapid braking of a far-away vehicle 300 is transmitted, the control unit 30 increases the distance from a near-by vehicle 200 by braking the vehicle 100 and or decelerates the vehicle 100 while taking precautions against a collision with a following vehicle 400. Further, the controller 30 can operate the passenger protection device in the standby mode so that the passenger protection device can be immediately operated when a collision with the following vehicle 400 occurs. An embodiment of the standby mode of the passenger protection device will be described below.

The passenger protection device may include a seatbelt, an airbag, or a seat controller in the vehicle 100.

Accordingly, when the passenger protection device enters the standby mode and it is a seatbelt, tension is generated in response to a signal from a collision sensor and sensitivity of the collision sensor can be improved. Further, when it is an airbag, an inflator explodes and deploys in response to a signal from the collision sensor, and sensitivity of the collision sensor can be improved. The airbag may be provided such that the position when the airbag is deployed is changed to fit to the sitting posture of a passenger.

Further, the seat controller can change the angles of a seat cushion and a seatback to fit to the sitting posture of a passenger which minimizes shock that is applied to the passenger in a rear collision, and can change the position of a headrest.

Accordingly, there is an effect that it is possible to minimize injury to a passenger even if a collision occurs due to a following vehicle 400.

Figure 3:
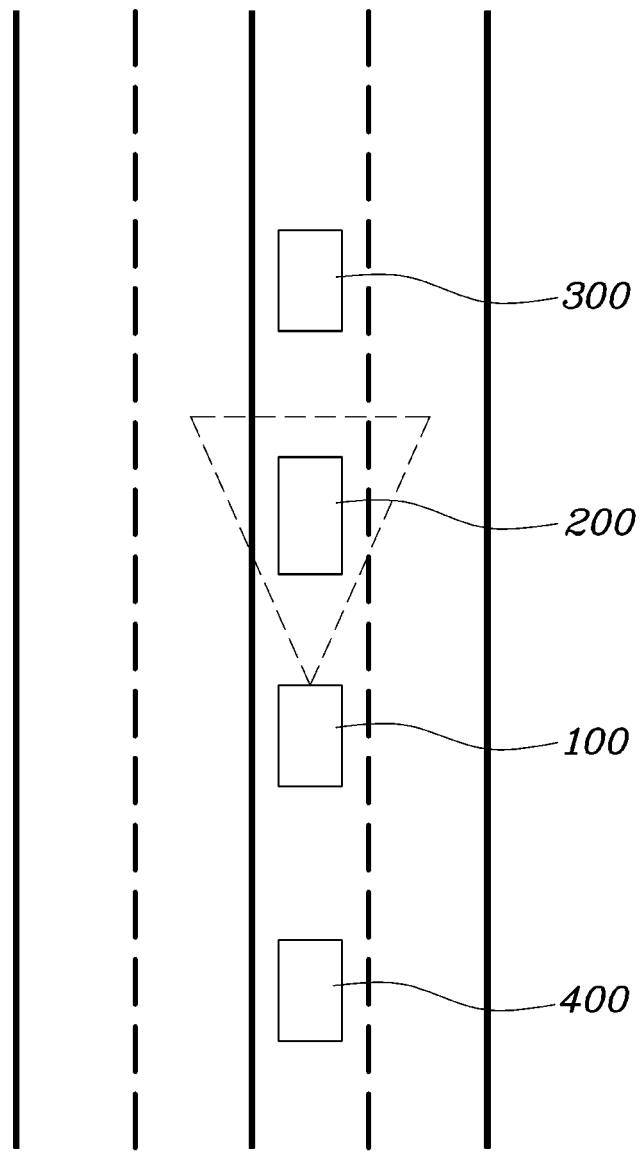
FIG. 3 is diagram showing a first forward vehicle, a second forward vehicle, and a following vehicle when a subject vehicle is driven.

FIG. 3 is a diagram showing forward vehicles 100 and following vehicles 100 when a vehicle 100 is driven.

Another embodiment of a vehicle control system according to the present invention is described with reference to FIGS. 1 and 3.

A V2V communication technology that transmits information of the vehicle 100 to external vehicle or receives vehicle information of external vehicle 100 using communication with vehicles 100 or a V2X communication technology that transmits information of the vehicle 100 to external vehicle 100 or receives vehicle information of external vehicle through infra system may be applied to the vehicle control system according to the present invention.

A receiving unit 10 of the vehicle control system according to the present invention receives braking information of a first forward vehicle 210 through V2X communication and the vehicle control system further includes a control unit 20 that improves responsiveness of the vehicle control system when the braking information of the first forward vehicle 210 received through the receiving unit 10 exceeds a reference value.

The receiving unit 10 can receive location information, movement information, or braking information of the external vehicle 100 through V2X communication or V2V communication. It is possible to determine the external vehicle 100 driven ahead of the vehicle 100 as a first forward vehicle 210 on the basis of the location information of the external vehicle 100 received by the receiving unit 10 and to receive braking information of the determined first forward vehicle 210.

The braking information received from the first forward vehicle 210 may be a deceleration amount or brake pressure of the first forward vehicle 210.

The reference value may be a brake pressure value that is generated in rapid braking or a deceleration amount due to rapid braking.

The control unit 20 can control the vehicle 100 such that braking responsiveness of the vehicle 100 is improved when the braking information of the first forward vehicle 210 received by the receiving unit 10 exceeds a preset reference value.

For example, it is possible to control driving of the vehicle 100 to increase the relative distance between the first forward vehicle 210 and the vehicle 100 or rapidly decelerate the vehicle by generating pre-pressure in the brakes of the vehicle 100.

Accordingly, there is an effect that it is possible to prevent a front collision of the vehicle 100 when the first forward vehicle 210 is rapidly braked and it is possible to prevent a collision by controlling the vehicle 100 to secure a safety distance when the vehicle 100 does not secure the safety distance from the first forward vehicle 210.

The vehicle control system further includes a sensing unit 70 that senses a braking situation of the first forward vehicle 210. The control unit 20 can improve responsiveness of the brake system of the vehicle 100 on the basis of the braking information of the first forward vehicle 210 received by the receiving unit 10 and the braking situation of the first forward vehicle 210 sensed by the sensing unit 70.

The sensing unit 70 is disposed in the vehicle 100 and can sense movement information of external obstacles. The sensing unit 70 can estimate movement information of the first forward vehicle 210 and the control unit 20 can control braking of the vehicle 100 by generalizing the braking information of the first forward vehicle 210 received by the receiving unit 10 and the braking information of the first forward vehicle 210 sensed by the sensing unit 70.

When the braking situation of the first forward vehicle 210 is not recognized through V2X communication such as when there is an error in wireless communication or the first forward vehicle 210 is caused to rapidly brake due to an external factor, it is possible to control braking of the vehicle 100 on the basis of the braking situation of the first forward vehicle 210 sensed by the sensing unit 70.

Accordingly, there is an effect that it is possible to prevent a collision with the first forward vehicle 210 by controlling braking of the vehicle 100 by sensing the braking situation of the first forward vehicle 210 through various methods.

The sensing unit 70 can sense a turn-on situation of the brake lights of the first forward vehicle 210 through a camera sensor 71 disposed in the vehicle 100 and can estimate the braking situation of the first forward vehicle 210 on the basis of the turn-on situation.

The camera sensor 71 connected with the sensing unit 70 can take a picture of the rear of the first forward vehicle 210.

When the brake lights of the tail lights of the first forward vehicle 210 are turned on, the sensing unit 70 can sense that braking of the first forward vehicle 210 is started.

The sensing unit 70 can sense a deceleration speed of the first forward vehicle 210 through a lidar sensor or a radar sensor 72 disposed in the vehicle 100 and can estimate the braking situation of the first forward vehicle 210 on the basis of deceleration.

When the braking situation of the first forward vehicle 210 is estimated on the basis of a picture taken by the camera sensor 71, the control unit 20 can control braking of the vehicle 100.

The vehicle control system further includes a sensing unit 70 that senses a braking situation of a first forward vehicle 210 and a determining unit 50 that determines whether V2X communication of an external vehicle 100 adjacent to the vehicle 100 is possible. When the determining unit 50 determines that V2X communication of the first forward vehicle 210 is impossible, the control unit 20 can improve responsiveness of the brake system of the vehicle 100 on the basis of the braking information of the first forward vehicle 210 sensed by the sensing unit 70.

When the determining unit 50 determines that V2X communication or V2V communication with the first forward vehicle 210 is impossible, the control unit 20 can control driving of the vehicle 100 on the basis of the braking information of the first forward vehicle 210 sensed by the sensing unit 70 of the vehicle 100.

The sensing unit 70 is connected with the radar sensor 72 and estimates movement information on location information of the first forward vehicle 210 sensed by the radar sensor 72. Further, the sensing unit 70 can take a picture of the first forward vehicle 210 through a camera sensor 71 and can estimate location information or braking information of the first forward vehicle 210 on the basis of the picture.

The receiving unit 10 receives braking information of a second forward vehicle 310 positioned ahead of the first forward vehicle 210 and the control unit 20 can improve responsiveness of the brake system of the vehicle 100 when the braking information of the first forward vehicle 210 and the braking information of the second forward vehicle 310 exceed a reference value.

The receiving unit 10 receives not only the braking information of the first forward vehicle 210 positioned ahead of the vehicle 100, but also braking of the second forward vehicle 310 driven ahead of the first forward vehicle 210, thereby being able to control braking of the vehicle 100 when the braking information of the first forward vehicle 210 or the braking information of the second forward vehicle 310 exceeds a preset reference value.

Accordingly, braking information of the second forward vehicle 310 which cannot be sensed by the sensing unit 70 is also received, whereby there is an effect that it is possible to prevent a chain rear-end collision of the vehicle 100 with the first forward vehicle 210.

When brake pressure included in the braking information of the first forward vehicle 210 received by the receiving unit 10 is a preset reference value or more, the control unit 20 can improve responsiveness of the brake system of the vehicle 100.

As an example of improving responsiveness of a brake system, pre-pressure is applied to the brakes of the vehicle 100, so the brakes can be immediately operated to brake the vehicle 100 when the vehicle 100 needs to be braked.

As another example of improving responsiveness of a brake system, there is increasing a target inter-vehicle distance between the vehicle 100 and the first forward vehicle 210, adjusting a jerk value of the vehicle 100, or adjusting a required deceleration speed.

The receiving unit 10 can estimate braking information of the first forward vehicle 210 by receiving the pressure of the brake pedal of the first forward vehicle 210.

The braking information of the first forward vehicle 210 which is received by the receiving unit 10 may be pressure that is applied to a brake pedal by the driver of the first forward vehicle 210 or pressure of a brake pedal that is operated by an autonomous driving system when the first forward vehicle 210 is autonomously driven.

The vehicle control system may further include a transmitting unit 40 that transmits braking information of a following vehicle 400 to a forward vehicle 100 when braking information of a first forward vehicle 210 received by the receiving unit 10 or braking information of the first forward vehicle 210 sensed by the sensing unit 70 exceeds a reference value.

When braking information of the first forward vehicle 210 received by the receiving unit 10 exceeds the preset reference value, in order to inform also the following vehicle 400 of this information, the transmitting unit 40 can transmit braking information of the first forward vehicle 210 to the following vehicle 400 when the braking information of the first forward vehicle 210 exceeds the preset reference value.

Accordingly, there is an effect that the following vehicle 400 can also take precautions against a rear-end collision with the vehicle 100 due to rapid braking of the first forward vehicle 210 by taking precautions against rapid braking of the first forward vehicle 210.

When the following vehicle 400 receives braking information of the first forward vehicle 210, the following vehicle 400 can also take precautions against a rear-end collision by increasing the distance from the vehicle 100, etc. by improving responsiveness of the brake system.

The vehicle control system further includes a determining unit 50 that determines whether V2X communication of an external vehicle 100 adjacent to the vehicle 100 is possible. When the determining unit 50 determines V2X communication of a following vehicle 400 is impossible and the braking information of a first forward vehicle 210 exceeds a reference value, the control unit 20 can set a passenger protection device 60 for protecting a passenger in a standby mode.

The passenger protection device 60, which is a device provided in the vehicle 100 to minimize injury to a passenger in a collision outside the vehicle 100, can keep a passenger safe even a collision occurs when it is in operation.

When V2V communication or V2X communication of a following vehicle 400 is impossible, there is a possibility of a collision of the following vehicle 400 and the vehicle 100.

In order to take measures against such a collision, when braking information about rapid braking of a second forward vehicle 310 is transmitted, the control unit 20 increases the distance from a first forward vehicle 210 by braking the vehicle 100 and or decelerates the vehicle 100 while taking precautions against a collision with a following vehicle 400. Further, the controller 30 can operate the passenger protection device 60 in the standby mode so that the passenger protection device 60 can be immediately operated when a collision with the following vehicle 400 occurs. An embodiment of the standby mode of the passenger protection device 60 will be described below.

The passenger protection device 60 may include a seatbelt 62, an airbag 61, or a seat controller 63 in the vehicle 100.

Accordingly, when the passenger protection device enters the standby mode and it is a seatbelt 62, tension is generated in response to a signal from a collision sensor and sensitivity of the collision sensor can be improved. Further, it is an airbag 61, an inflator explodes and deploys in response to a signal from the collision sensor, and sensitivity of the collision sensor can be improved. The airbag 61 may be prepared such that the position when the airbag is developed is changed to fit to the sitting posture of a passenger.

Further, the seat controller 63 can change the angles of a seat cushion and a seatback to fit to the sitting posture of a passenger which minimizes shock that is applied to the passenger in a rear collision, and can change the position of a headrest.

Accordingly, there is an effect that it is possible to minimize injury to a passenger even if a collision occurs due to a following vehicle 400.

Figure 4:
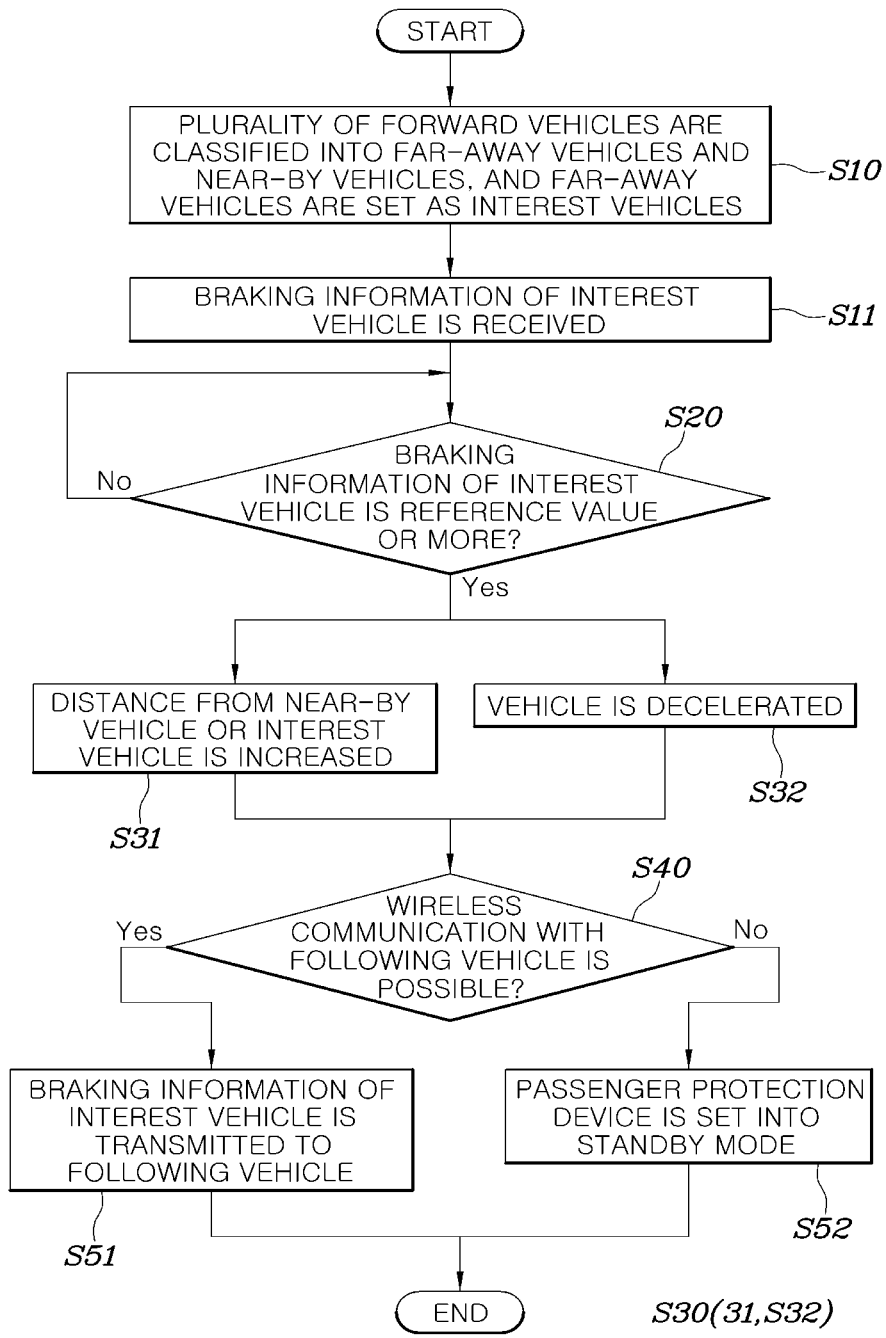
FIG. 4 is a flowchart of a vehicle control method according to an embodiment of the present invention.

FIG. 4 is a flowchart of the vehicle control method according to an embodiment of the present invention.

An exemplary embodiment of the vehicle control method according to the present invention is described with reference to FIG. 4.

The vehicle control method according to the present invention includes: sensing a plurality of forward vehicles 200 and 300 positioned ahead of a vehicle 100 in the driving direction, classifying the forward vehicles 200 and 300 into a far-away vehicle 300 and a short-range vehicle 200, and setting the far-away vehicle 300 as an interest vehicle 300 (S10); receiving braking information of the interest vehicle 300 set in the setting S10 from the interest vehicle 300 (S11); and controlling braking the vehicle 100 on the basis of the braking information of the interest vehicle 30 received in the receiving S11 (S30).

The vehicle control method further includes determining whether the braking information of the interest vehicle 300 received in the receiving S11 is a reference value or more (S20).

The controlling of braking S30 can control braking of the vehicle when the braking information of the interest vehicle 300 is the reference value or more in the determining S20.

Controlling the vehicle 100 to increase the distance from the near-by vehicle 200 or the interest vehicle (S31) may be included in the controlling of braking S30.

Controlling the vehicle 100 to decelerate the vehicle 100 (S32) may be included in the controlling of braking S30.

The vehicle control method may further include transmitting braking information of the interest vehicle 300 to a following vehicle 400 when the braking information of the interest vehicle 300 exceeds the reference value in the determining S20 (S51).

The vehicle control method may further include: determining whether wireless communication of an adjacent following vehicle 400 is possible (S40); and setting a passenger protection device for protecting a passenger into a standby mode when it is determined that wireless communication of the following vehicle 400 is impossible in the determining of whether wireless communication is possible S40 and when the braking information of the interest vehicle 300 exceeds the reference value (S52).

Figure 5:
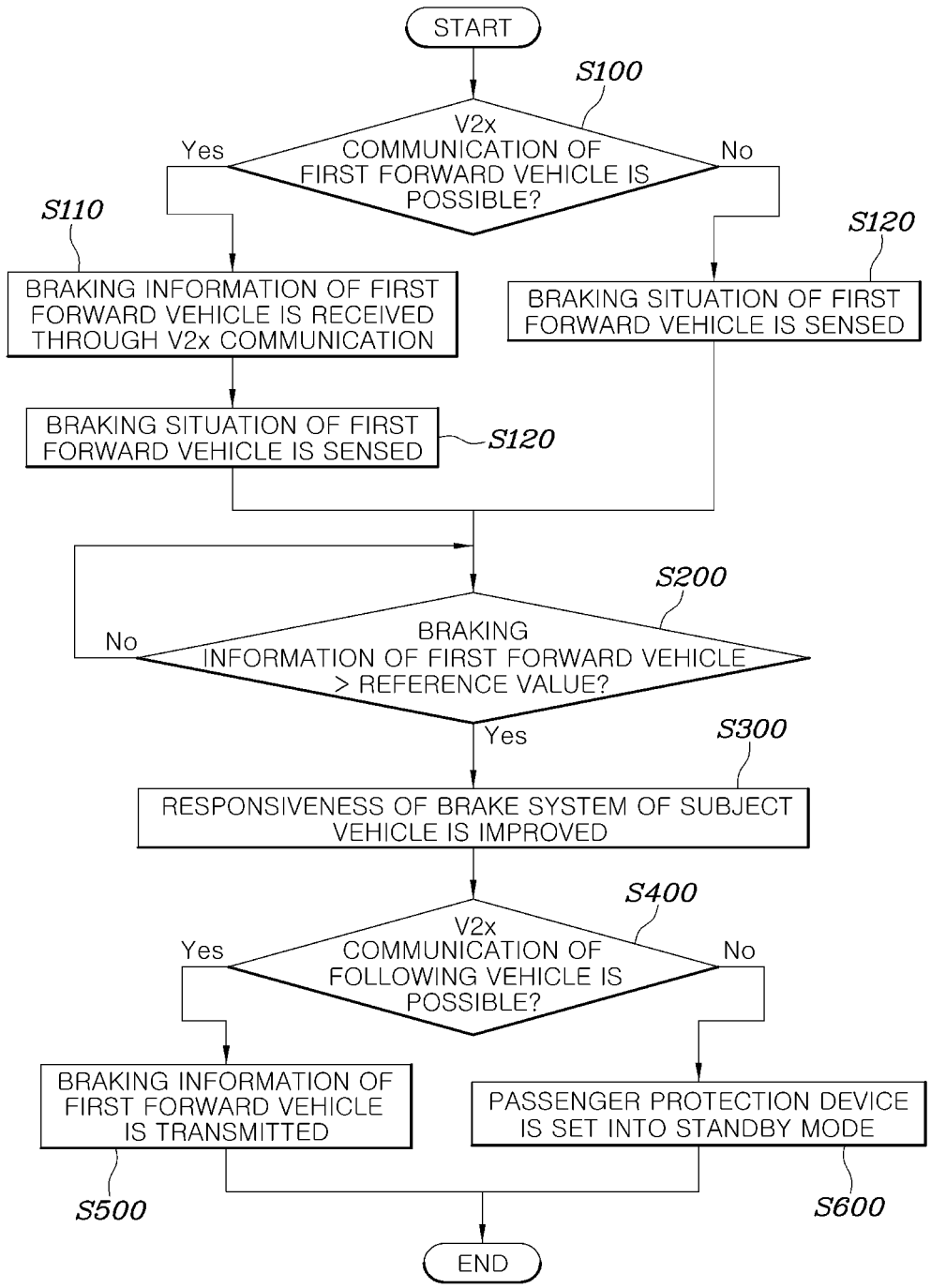
FIGS. 5 and 6 are flowcharts of a vehicle control method according to another embodiment of the present invention.
Figure 6:
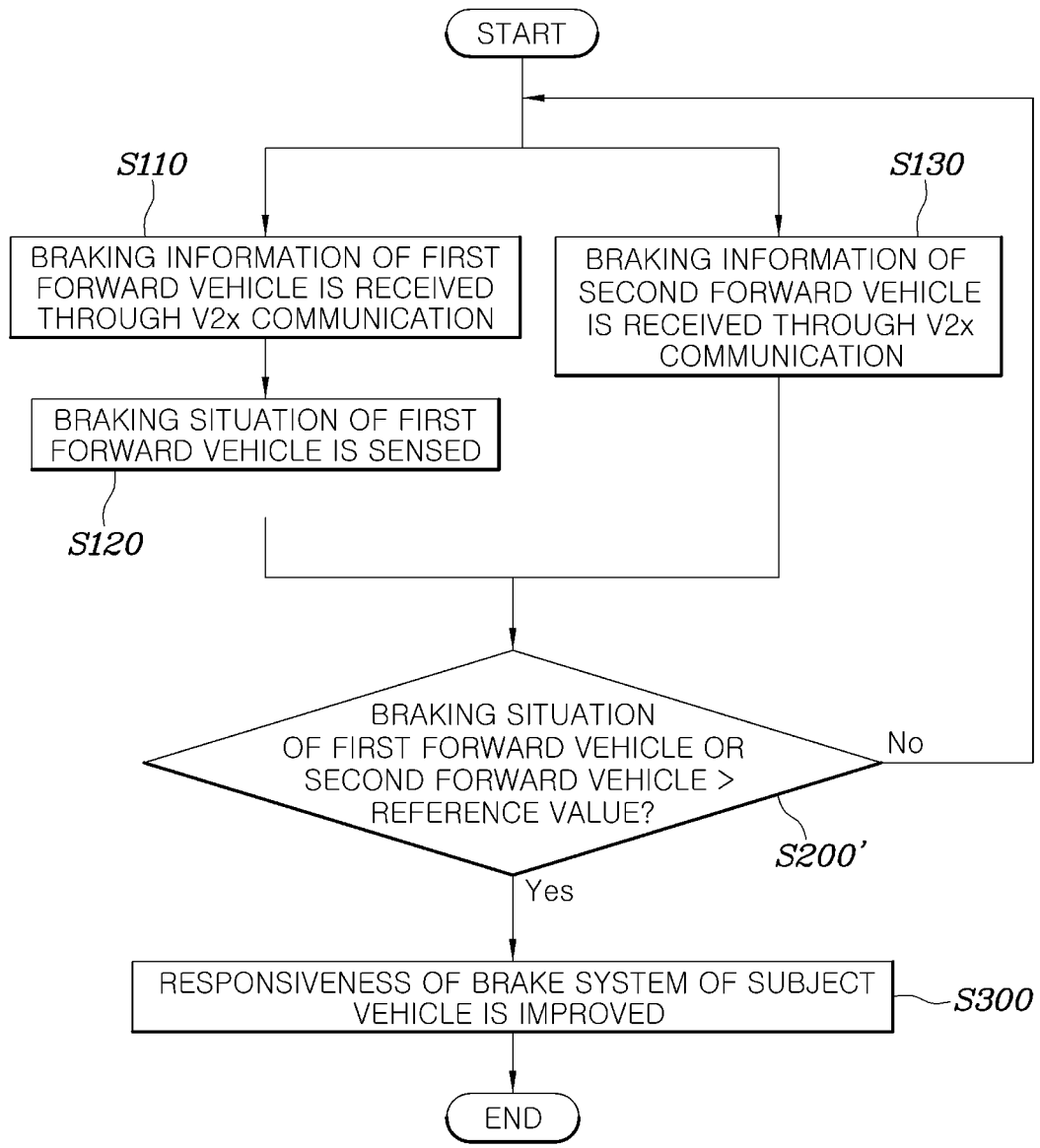

FIGS. 5 and 6 are flowcharts of a vehicle control method according to another embodiment of the present invention.

Another embodiment of a vehicle control method according to the present invention is described with reference to FIGS. 5 and 6.

The vehicle control method according to the present invention is a method of controlling the vehicle control system described above.

The vehicle control method according to the present invention includes: receiving braking information of a first forward vehicle 210 through V2X communication (S110); determining whether the braking information of the first forward vehicle 210 received in the receiving S110 is a reference value or more (S200); and improving responsiveness of the brake system of a vehicle 100 when braking information of the first forward vehicle 210 exceeds the reference value in the determining (S300).

The vehicle control method further includes sensing a braking situation of the first forward vehicle 210 (S120) before the determining S200. The determining S200 can determine that braking information of the first forward vehicle 210 is the reference value or more on the basis of the braking information of the first forward vehicle 210 received in the receiving S110 and the braking situation of the first forward vehicle 210 sensed in the sensing S120.

The vehicle control method further includes determining whether V2X communication of an external vehicle 100 adjacent to the vehicle 100 is possible (S100) before the receiving S110. When it is determined that V2X communication of the first forward vehicle 210 is impossible in the determining of whether V2X communication is possible S200, the determining S200 can determine that the braking information of the first forward vehicle 210 is the reference value or more on the basis of the braking information of the first forward vehicle 210 sensed in the sensing S120.

The vehicle control method may further include transmitting the braking information of the first forward vehicle 210 to a following vehicle 400 (S500) when the sensed braking information of the first forward vehicle 210 exceeds the reference value in the determining S200.

The vehicle control system further includes determining whether V2X communication of an external vehicle 100 adjacent to the vehicle 100 is possible (S400) before the transmitting S50, and may further include setting a passenger protection device 60 for protecting a passenger in a standby mode when it is determined V2X communication of a following vehicle 400 is impossible and the braking information of a first forward vehicle 210 exceeds a reference value (S60).

A method of preventing a chain rear-end collision by receiving braking information from a first forward vehicle 210 and a second forward vehicle 310 is described with reference to FIG. 6.

The vehicle control method further includes: receiving braking information of a second forward vehicle 310 positioned ahead of the first forward vehicle 210 (S13); and comparing the braking information of the first forward vehicle 210 or the second forward vehicle 310 with a reference value (S200'). Improving responsiveness of a brake system S300 can improve responsiveness of the brake system of the vehicle 100 on the basis of the braking information of e first forward vehicle 210 and the second forward vehicle 310.

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. A vehicle control system comprising:
   a memory storing instructions that when executed by a processor controls a vehicle;
   the processor configured to:

sense a plurality of forward vehicles positioned ahead of a subject vehicle in a driving direction, to classify each of the forward vehicles as a far-away vehicle or a near-by vehicle, and to set each of the far-away vehicles as an interest vehicle;

receive braking information of each of the interest vehicles from the respective interest vehicles; and control braking of the subject vehicle based on the braking information received from each of the interest vehicles; and a transmitter configured to transmit the braking information of one or more of the interest vehicles to a following vehicle when the braking information of the respective one or more interest vehicles received exceeds a reference value, wherein the processor is further configured to determine whether wireless communication of a following vehicle adjacent to the subject vehicle is possible, wherein when it is determined that wireless communication of the following vehicle adjacent to the subject vehicle is impossible and braking information of one or more of the far-away vehicles exceeds the reference value, the processor is configured to set a passenger protection device for protecting a passenger into a standby mode.

2. The vehicle control system of claim 1, wherein the processor is configured to classify a forward vehicle at a predetermined distance or more as a far-away vehicle and to classify a forward vehicle at a distance less than the predetermined distance as a near-by vehicle.

3. The vehicle control system of claim 1, wherein the processor is configured to set a far-away vehicle as a second or more forward vehicle from the subject vehicle.

4. The vehicle control system of claim 1, wherein the processor is configured to control braking of the subject vehicle when the braking information of one or more of the interest vehicles received exceeds a reference value.

5. The vehicle control system of claim 4, wherein the processor is configured to control the subject vehicle to increase a distance from one or more of the near-by vehicles or one or more of the interest vehicles when the braking information of one or more of the interest vehicles received exceeds the reference value.

6. The vehicle control system of claim 4, wherein the processor is configured to control the subject vehicle to decelerate when the braking information of one or more of the interest vehicles received exceeds the reference value.

7. The vehicle control system of claim 1, wherein the processor is configured to estimate the braking information of each of the interest vehicles by receiving pressure of a brake pedal of each of the interest vehicles.

8. The vehicle control system of claim 1, wherein the processor is configured to receive braking information of a first forward vehicle through V2X communication, and the processor is configured to improve responsiveness of a brake system of the subject vehicle when the braking information of the first forward vehicle received by the receiving unit exceeds a reference value.

9. The vehicle control system of claim 8, further comprising a sensor configured to sense a braking situation of the first forward vehicle, wherein the processor is configured to improve the responsiveness of the brake system of the subjective vehicle based on the braking information of the first forward vehicle received and the braking situation of the first forward vehicle sensed by the sensor.

10. The vehicle control system of claim 9, wherein the processor is further configured to determine whether V2X communication of an external vehicle adjacent to the subject vehicle is possible, when it is determined that V2X communication of the first forward vehicle is impossible, the processor is configured to improve the responsiveness of the brake system of the subject vehicle based on the braking information of the first forward vehicle sensed by the sensor.

11. A vehicle control method comprising:

sensing a plurality of forward vehicles positioned ahead of a subject vehicle in a driving direction, classifying each of the forward vehicles as a far-away vehicle or a near-by vehicle, and setting each of the far-away vehicles as an interest vehicle;

receiving braking information of each of the interest vehicles from the respective interest vehicles;

controlling braking of the subject vehicle based on the braking information of each of the interest vehicles;

transmitting the braking information of one or more of the interest vehicles to a following vehicle adjacent to the subject vehicle when the braking information of the respective one or more interest vehicles exceeds a reference value;

determining whether wireless communication of the following vehicle adjacent to the subject vehicle is possible; and setting a passenger protection device for protecting a passenger into a standby mode when wireless communication of the following vehicle adjacent to the subject vehicle is impossible and when the braking information of one or more of the interest vehicles exceeds the reference value.

12. The vehicle control method of claim 11, further comprising determining that the braking information of one or more of the interest vehicles is a reference value or more, wherein the controlling of braking controls braking of the subject vehicle when the braking information of one or more of the interest vehicles is the reference value or more.

13. The vehicle control method of claim 11, wherein the receiving includes receiving braking information of a first forward vehicle through V2X communication, and the vehicle control method further includes:

determining that the braking information of the first forward vehicle is a reference value or more; and improving responsiveness of a brake system of the subject vehicle when the braking information of the first forward vehicle exceeds the reference value.

14. The vehicle control method of claim 13, further comprising sensing a braking situation of the first forward vehicle before the determining, wherein the determining determines whether the braking information of the first forward vehicle is the reference value or more based on the braking information of the first forward vehicle and the braking situation of the first forward vehicle.

15. The vehicle control method of claim 14, further comprising:

transmitting the braking information of the first forward vehicle to a following vehicle when the braking information of the first forward vehicle exceeds the reference value;

determining whether V2X communication of an external vehicle adjacent to the subject vehicle is possible before the transmitting; and setting a passenger protection device for protecting a passenger into a standby mode when it is determined that V2X communication of the following vehicle is impossible and when the braking information of the first forward vehicle exceeds the reference value.

16. The vehicle control method of claim 13, further comprising:
   receiving braking information of a second forward vehicle positioned ahead of the first forward vehicle; and
   comparing the braking information of the first forward vehicle or the second forward vehicle with the reference value,
   wherein the improving of responsiveness of the brake system of the subject vehicle improves the responsiveness of the brake system of the subject vehicle based on the braking information of the first forward vehicle and the second forward vehicle.

\* \* \* \* \*